United States Patent Office.

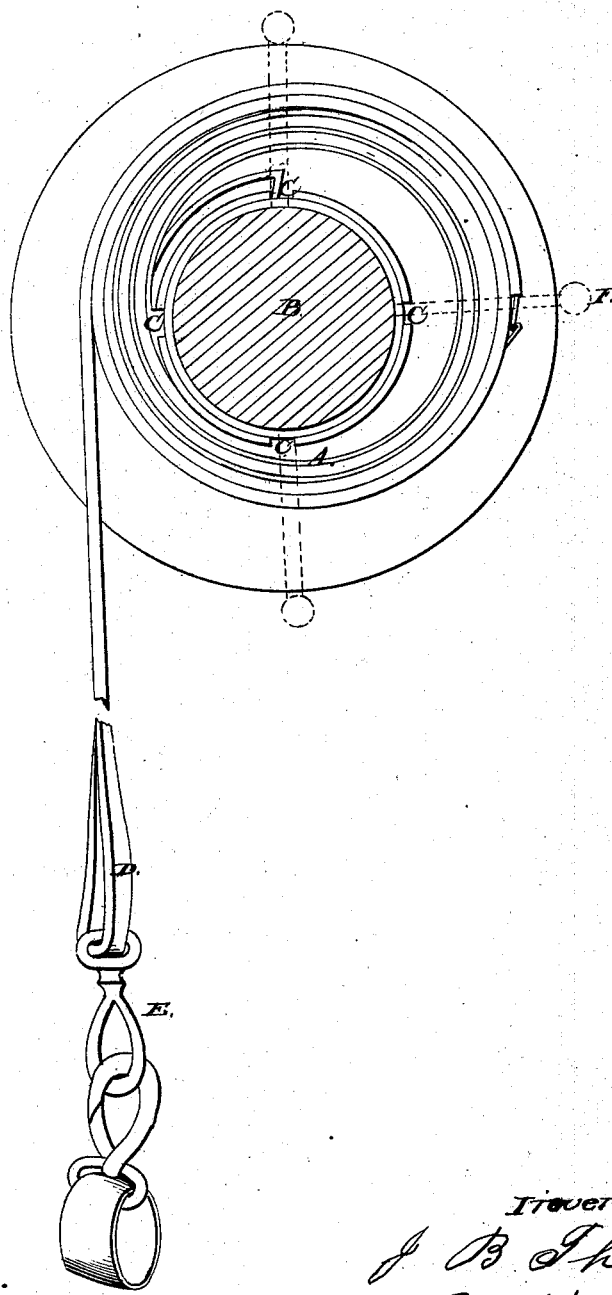

J. B. THORNTON, OF MADISON, WISCONSIN.

Letters Patent No. 69,048, dated September 17, 1867.

IMPROVEMENT IN DEVICE FOR HITCHING HORSES.

The Schedule referred to in these Letters Patent and making part of the same.

TO ALL WHOM IT MAY CONCERN:

Be it known that I, J. B. THORNTON, of Madison, in the county of Dane, and State of Wisconsin, have invented a new and improved Device for Hitching Horses; and I do hereby declare that the following is a full, clear, and exact description thereof, which will enable others skilled in the art to make and use the same, reference being had to the accompanying drawings, forming part of this specification.

The present invention relates to a new device to be attached to the inside end of a carriage-wheel hub, by means of which, if the horse or horses harnessed in and to the carriage, be hitched to such device, upon any attempt to move forward the wheel is turned sufficiently to draw in the rein and thus stop them, while if they move backward the device is free to slip around the wheel-hub, and no harm is occasioned. In the accompanying drawings my improved device for hitching horses is illustrated, the figure being a central transverse section of the same.

A is a spring coiled or wound spirally about and around a wheel-hub, B, with notches, C, of which, by means of its hook-shaped end, it becomes engaged, and thus made to tightly wind the spring about the hub, as by the movement of the horse or horses harnessed in the carriage the said wheel is turned. D, a strap fastened to outer coil of spring A, from which it is extended, and has at its outer end a snap-hook, E, for being engaged with the rein of harnesses. F, bolts fixed in wheel-hubs for catching the strap D when not to be used.

I claim as new, and desire to secure by Letters Patent—

A device for hitching horses, constructed and applied to wheel-hubs, substantially as and for the purpose described.

The above specification of my invention signed by me this 17th day of June, 1867.

J. B. THORNTON.

Witnesses:
    CHAS. C. G. THORNTON,
    W. B. JARVIS.